United States Patent [19]

Heuvel

[11] Patent Number: 4,811,456
[45] Date of Patent: Mar. 14, 1989

[54] APPARATUS FOR SEPARATING BONE AND FLESH OF THE LEGS OF POULTRY OR PART THEREOF

[75] Inventor: Johannes v. d. Heuvel, Noordwijkerhout, Netherlands

[73] Assignee: Machinefabriek MEYN B.V., Ae Oostzaan, Netherlands

[21] Appl. No.: 143,562

[22] Filed: Jan. 12, 1988

[30] Foreign Application Priority Data

Jan. 28, 1987 [NL] Netherlands .................. 8700213

[51] Int. Cl.⁴ ................ A22C 17/04; A22C 21/00
[52] U.S. Cl. ........................................ 17/1 G; 17/11
[58] Field of Search ...................... 17/11, 1 G, 46

[56] References Cited

U.S. PATENT DOCUMENTS

| | | | |
|---|---|---|---|
| 4,380,849 | 4/1983 | Adkison et al. | 17/1 G X |
| 4,446,600 | 5/1984 | Hooley et al. | 17/1 G X |
| 4,488,332 | 12/1984 | Atteck et al. | 17/46 |
| 4,736,492 | 4/1988 | Hazenbroek et al. | 117/46 |

*Primary Examiner*—Willie G. Abercrombie
*Attorney, Agent, or Firm*—Dority & Manning

[57] ABSTRACT

An apparatus for separating bone and flesh of the legs of poultry or part thereof is provided, comprising a stripper with an opening for passing through the bone and with an edge portion surrounding said opening for holding up the flesh. The stripper preferably comprises a clamping frame stretchingly supporting therein a membrane with a central circular opening for letting through the bone.

17 Claims, 2 Drawing Sheets

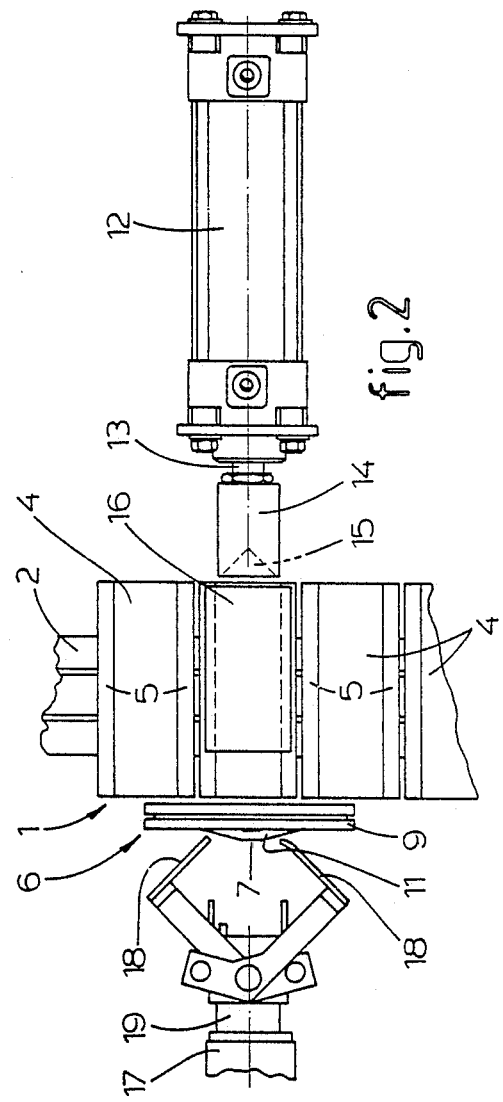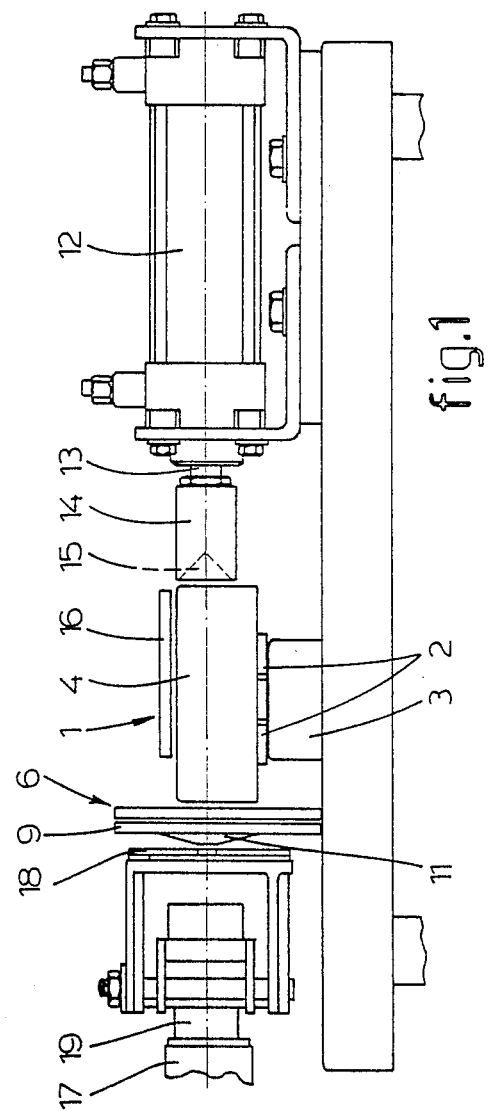

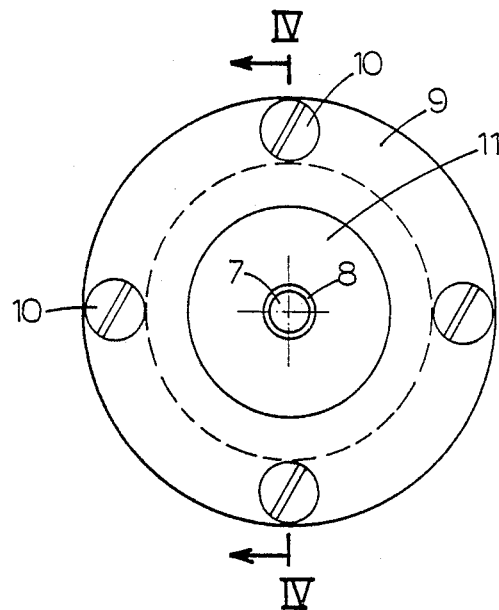
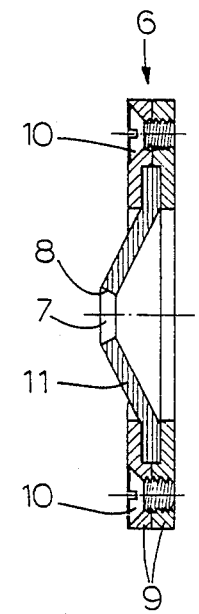
fig.3                fig.4
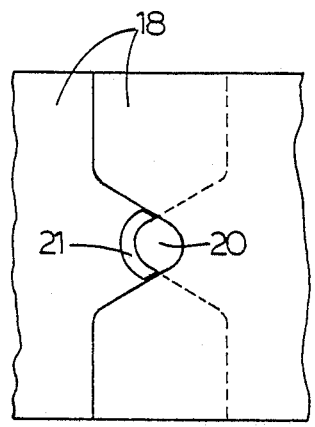
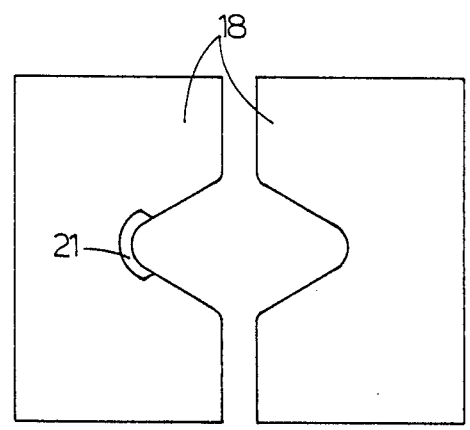
fig.6                fig.5

APPARATUS FOR SEPARATING BONE AND FLESH OF THE LEGS OF POULTRY OR PART THEREOF

The invention relates to an apparatus for separating bone and flesh of the legs of poultry or part thereof, such as a thigh-bone or the like, comprising a stepwise moving conveyor for conveying said legs practically transversely to their longitudinal axis.

During the course from poultry farmer to consumer at present poultry commonly is divided practically mechanically into several components attractive for consumers. For this purpose already a large number of specialized processing devices are available that all are meant for carrying out one specific process.

Further to dividing the poultry into components recently a new phase in processing poultry has commenced, namely separating bones and flesh, especially the bone and flesh of the legs of the poultry or part thereof, such as the drumstick and the like. Although some efforts have been made on this terrain for mechanically separating bone and flesh, the results until now are far from satisfactory and mainly use is made of hand-work. It will be clear that this hand-work is expensive and less preferred in view of hygienics whereas the working-circumstances, such as humidity and cold, are less favourable for the operators. The causes which lead to the failure of the known apparatus have to be found in the variation of the shape and dimensions as well as the composition of the legs to be processed.

It is an object of the invention to provide an apparatus of the above-mentioned kind eliminating effectively the disadvantages mentioned before.

As for this the apparatus according to the invention is characterized by a stripper positioned beside the conveyor, said stripper being provided with an opening for passing-through the bone and an edge portion surrounding said opening for holding up the flesh, the apparatus further comprising an actuating means for moving the bone through the stripper.

By the cooperation between the stripper and the actuating means an effective separation of bone and flesh is obtained wherein the flesh will be advanced by the conveyor for further processing.

It is advantageous if the stripper comprises a clamping frame stretchingly supporting therein a membrane with a central circular opening. Such a stripper means provides excellent separating characteristics.

For obtaining a good centering operation of the stripper for the legs to be processed it is handy if the membrane is funnel-shaped in its stretched condition, wherein the opening edge is spaced furthest from the conveyor. In this way the end of each leg always will be guided toward the opening in the membrane, also when initially the leg is not aligned with this opening.

If, according to a further advantageous embodiment of the apparatus according to the invention, the opening of the membrane has a diameter that is slightly smaller than the average diameter of the bones of legs to be processed, wherein the material of the membrane comprises a strong but still elastic material, such as polyurethane or the like, the membrane will keep its advantageous effect in a rather wide area of varying leg dimensions.

Further it is advantageous if the stripper comprises a number of clamping frames with membranes positioned on a rotatable carousel, wherein each clamping frame can be brought into a working position by an appropriate rotation of the carousel. Like this cleaning, repairing or changing the strippers is possible without stopping the apparatus.

Moreover it is of advantage if the stripper comprises a movement-sensor that, through a control unit, is connected with the driving means of the conveyor. It is imaginable for example that a bone has not been moved through the stripper completely at the moment where the conveyor starts moving again. In such a case the movement-sensor will registrate a displacement of the stripper in parallel with the conveyor and will generate a stopping signal for the conveyor by means of the control unit. Like this damaging the apparatus or splintering the bone is avoided.

Hereafter the invention will be explained further with reference to the drawing in which an embodiment of the apparatus according to the invention is illustrated.

FIG. 1 is an side elevational view of an embodiment of the apparatus according to the invention;

FIG. 2 shows the apparatus of FIG. 1 in a top plan view;

FIG. 3 shows a front elevational view of a stripper according to the invention;

FIG. 4 shows a cross-sectional view along line IV—IV in FIG. 3;

FIG. 5 illustrates a detail of a pulling means according to the invention in its opened position, and FIG. 6 shows the pulling means of FIG. 5 in its closed position.

The apparatus for separating the bone and flesh of the legs of poultry or part thereof shown in FIG. 1 comprises a stepwise moving conveyor 1, existing of a conveyor chain 2, a chain guide 3 (see FIG. 1) and conveyor boxes 4 supported by the conveyor chain 2. Each conveyor box 4 has side walls 5 and is opened on its forward and rearward sides. In the conveyor boxes 4 the legs or parts thereof, such as drumsticks or the like, are conveyed practically transversely to their longitudinal axis. The activation of the conveyor 1 is such that it stops always when the opening of conveyor box 4 is aligned with a stripper 6 that will be described hereafter.

The stripper 6 is positioned beside the conveyor. As can be seen clearly in FIGS. 3 and 4 the stripper is provided with an opening 7 for passing-through the bone and an edge portion 8 surrounding said opening 7 for holding up the flesh. The stripper 6 comprises a clamping frame 9 that, as appears clearly from FIG. 4, is constituted of two parts held together by mounting means 10 and a membrane 11 with the central circular opening 7 stretchingly supported in said clamping frame 9.

The membrane 11 is funnel-shaped in its stretched condition, wherein the opening edge 8 is spaced furthest from the conveyor 1, as appears among others from FIGS. 1 and 2.

The opening 7 of the membrane 11 has a diameter that is slightly smaller than the average diameter of the bones of the legs to be processed. The material of the membrane 11 comprises a strong but still elastic material, such as polyurethane or the like. Such a membrane 11 is extremely fit for processing legs of which the bone diameters show a certain spreading. Further the funnel shape of the membrane 11 offers a good centering of the legs wherein said legs are always advantageously moved towards the opening 7.

In an other, not illustrated, embodiment of the stripper it comprises a number of clamping frames with membranes positioned on a rotatable carousel, wherein each clamping frame by an appropriate rotation of the carousel can be brought into a working position, aligned with a conveyor box 4. With such an embodiment of the stripper it is possible while the apparatus is operating to clean and change the clamping frames with membranes that at that very moment are not in their operative position. Further it is possible that the stripper comprises a movement-sensor that, through a control unit, is connected with the driving means of the conveyor. If now the conveyor 1 starts moving when a bone has not been pushed totally through the stripper said movement-sensor registrates a displacement of the stripper in parallel with the conveyor and generates a signal for the control unit for stopping the conveyor. As a result it can be avoided that the apparatus will be damaged or dislocated or that the bone is fractured possibly resulting in splinters in the flesh.

At the other side of the conveyor 1, opposite of the stripper 6, an actuating means 12 is positioned comprising a cylinder-piston assembly. The piston-rod 13 of this cylinder-piston assembly 12 provides a pushing rod for at least partially moving the bones from the conveyor 1 out of the conveyor box 4 through the stripper 6. At its end the piston-rod 13 carries a pushing means 14 having a centering recess 15. If the piston-rod 13 of the cylinder-piston assembly 12 is extended the pushing means 14 with its centering means 15 engages the end of a leg lying in the conveyor box 4 and pushes it at least partially through the opening 7 of the membrane 11.

For avoiding that during the motion of the leg through the membrane 11 said leg deflects upwardly a guide 16 is positioned above the conveyor 1, as it were closing the conveyor box 4 at its upper side.

At the side of the stripper 6 facing away from the conveyor 1 a pulling means 17 is provided for gripping a bone being partially moved through the stripper 6 and for pulling said bone through the stripper 6. The pulling means 17 comprises two cooperating jaws 18 that are mounted at the end of the piston-rod 19 of the cylinder-piston assembly-shaped pulling means. Like this the jaws are commonly movable to and fro in line with the piston-rod 13 of the actuating means 12.

FIG. 5 shows in detail the opened position of the jaws 18 whereas FIG. 6 shows the closed position of the jaws 18. An opening 20 is formed of which the width depends on an abutment means 21 on one of said jaws 18. The opened position of the jaws 18 is also illustrated in FIG. 2, whereas FIG. 1 shows the closed position thereof.

The operation of the apparatus is as follows: A leg supplied by the conveyor 1 in a conveyor box 4 is aligned with the actuating means 12 and the stripper 6. Next the piston-rod 13 and the pushing means 14 of the actuating means 12 are moved to the left, the pushing means 14 engaging the leg and starting to push the bone thereof through the opening 7 of the membrane 11. When the leading part of the bone has passed the opening 7 the jaws 18 are moved from their position shown in FIG. 2 towards their closed position shown in FIG. 1, whereafter the piston-rod 19 moves the bone that partially extends through the opening further to the left. Still before the bone has totally passed the opening 7 in the membrane 11 and the flesh has remained in the conveyor box 4, the piston-rod 13 moves back to its starting position shown in FIG. 2. After the bone has totally passed the opening 7 it is removed from the jaws 18 in a way not shown in detail, whereafter the jaws 18 and the piston-rod 19 also reach their starting position shown in FIG. 2. Next the conveyor moves one step ahead, thus positioning the leg contained in the next conveyor box 4 between the pushing means 14 and the stripper 6.

The invention is not restricted to the embodiment illustrated before, but can be varied widely within the scope of the invention.

I claim:

1. Apparatus for separating flesh from the bones of the legs of poultry, such as thighs and drumsticks, comprising:
   (a) a moving conveyor which moves in stepwise increments, for conveying said legs in a direction substantially transversely of their longitudinal axis;
   (b) a stripper, disposed alongside said conveyor, having a frame supporting an elastic funnel-shaped membrane, which has a rounded opening, having dimensions to permit the leg bones to pass therethrough but which do not permit the flesh of said legs to pass therethrough; and
   (c) means for moving individual legs along their longitudinal axes transversely of said conveyor into said stripper, continuing said movement to move said leg bones through the rounded opening in said membrane while stripping the flesh from said bones.

2. Apparatus as set forth in claim 1, wherein said rounded opening is circular and is located substantially in the center of said membrane.

3. Apparatus as set forth in claim 1, wherein said membrane is stretched within said supporting frame and said rounded opening is spaced away from said conveyor.

4. Apparatus as set forth in claim 2, wherein said opening in said membrane has a diameter that is slightly smaller than the average diameter of the bones of legs to be processed, and said membrane is composed of polyurethane.

5. Apparatus as set forth in claim 1, wherein said stripper comprises a plurality of supporting frames and membranes disposed on a rotatable carrousel which is indexed in timed relation with said conveyor.

6. Apparatus as set forth in claim 1, wherein said stripper includes a movement sensor which is connected to the driving means of said conveyor through a control unit.

7. Apparatus as set forth in claim 1, wherein said means for moving said legs transversely of said conveyor comprises a cylinder-piston assembly disposed alongside said conveyor, opposite said stripper, said piston assembly having a pushing rod for at least partially moving said leg bones from said conveyor through said opening in said membrane.

8. Apparatus as set forth in claim 7, wherein said pushing rod is provided with a centering recess at its end.

9. Apparatus as set forth in claim 7 or 8, wherein guide means are provided for preventing upward motion of said legs when they are moved transversely of said conveyor.

10. Apparatus as set forth in claim 1, wherein a pulling means is provided for gripping a leg bone which has been partially moved through said opening to pull said leg bone therethrough.

11. Apparatus as set forth in claim 10, wherein said pulling means comprises two cooperating jaws that are commonly movable to and fro, in line with said pushing cylinder-piston assembly by means of a pulling cylinder-piston assembly.

12. Apparatus as set forth in claim 7, wherein a pulling means is provided for gripping a leg bone which has been partially moved through said opening to pull said leg bone therethrough.

13. Apparatus as set forth in claim 12, wherein said pulling means comprises two cooperating jaws that are commonly movable to and fro, in line with said pushing cylinder-piston assembly by means of a pulling cylinder-piston assembly.

14. Apparatus for separating the flesh from the bone of the legs of poultry, comprising:
  (a) a conveyor having a series of compartments for conveying said legs, each of which contains a single leg;
  (b) means to drive said conveyor intermittently;
  (c) stripping means disposed alongside said conveyor comprising a funnel-shaped elastic membrane having a rounded opening large enough to permit passage of the bones of said legs but small enough to prevent the passage of the flesh of said legs therethrough;
  (d) means to move said stripping means into a stripping position adjacent said conveyor;
  (e) means to coordinate the movement of said conveyor with the movement of said stripper so that said stripper is in said stripping position adjacent a compartment having a leg when said conveyor is stationary; and
  (f) means for moving said legs transversely of said conveyor, along their longitudinal axes, when said conveyor is stationary and said stripper is in the stripping position, to push the bones of said legs through said opening and to strip said flesh from said bones.

15. Apparatus as set forth in claim 14, wherein said stripping means comprises a clamping frame for holding said elastic membrane in a stretched condition.

16. Apparatus as set forth in claim 14, wherein said rounded opening is circular and is located in the center of said membrane.

17. Apparatus as set forth in claim 14, wherein pulling means are disposed adjacent said rounded opening for clamping and pulling said bones through said opening.

* * * * *